US005194212A

United States Patent [19]
Bonnett

[11] Patent Number: 5,194,212
[45] Date of Patent: Mar. 16, 1993

[54] METHOD OF MANUFACTURING A FIBER-REINFORCED STRUCTURE HAVING A HOLLOW BLOW-MOLDING CORE

[75] Inventor: Roy E. Bonnett, Birmingham, Mich.

[73] Assignee: Ford Motor Company, Dearborn, Mich.

[21] Appl. No.: 629,773

[22] Filed: Dec. 18, 1990

[51] Int. Cl.⁵ .................. B29C 49/04; B29C 49/18; B29C 49/20

[52] U.S. Cl. .................. 264/513; 264/515; 264/516; 425/503; 156/245; 156/285; 156/287

[58] Field of Search .............. 264/513, 515, 512, 516, 264/314, 257, 258; 425/503, 504; 156/245, 285, 286, 287

[56] References Cited

U.S. PATENT DOCUMENTS

| | | | |
|---|---|---|---|
| 2,865,079 | 12/1958 | Marchioli et al. | 25/128 |
| 4,112,142 | 10/1978 | Lawrence et al. | 264/97 |
| 4,435,240 | 3/1984 | Knaus et al. | 156/245 |
| 4,591,327 | 5/1986 | Hautemont | 425/305.1 |
| 4,605,462 | 8/1986 | Lehner | 156/245 |
| 4,634,566 | 1/1987 | Schlenz | 264/515 |
| 4,719,072 | 1/1988 | Kojima et al. | 264/515 |
| 4,740,346 | 4/1988 | Freeman | 264/258 |
| 4,806,298 | 2/1989 | Wilkinson et al. | 264/115 |
| 4,849,147 | 7/1989 | Freeman | 264/138 |
| 4,863,771 | 9/1989 | Freeman | 428/36.1 |
| 5,000,990 | 3/1991 | Freeman | 264/314 |
| 5,080,850 | 1/1992 | Holloway | 264/257 |

FOREIGN PATENT DOCUMENTS

| | | | |
|---|---|---|---|
| 611163 | 12/1960 | Canada | 156/245 |
| 212140 | 3/1987 | European Pat. Off. | 264/314 |
| 2304543 | 8/1974 | Fed. Rep. of Germany | 264/515 |
| 61-035930 | 2/1986 | Japan | 264/516 |
| 61-227017 | 10/1986 | Japan | 264/516 |
| 62-004057 | 1/1987 | Japan | 264/516 |

*Primary Examiner*—Jan H. Silbaugh
*Assistant Examiner*—Catherine Timm
*Attorney, Agent, or Firm*—Damian Porcari; Roger L. May

[57] ABSTRACT

A fiber reinforced structure having a hollow blow-molded core and a method for manufacturing the same. Bulk fibrous material is dispensed between two die pieces of a mold. A blow-moldable plastic parison is extruded within the fibrous material. The mold is closed, pinching the parison closed and detaching the bulk fibrous material from the structure. The parison is inflated thus forcing the fibrous material against the interior mold walls. Liquid resin is injected into mold and impregnates the fibrous material. After curing, the finished reinforced structure is removed from the mold.

13 Claims, 2 Drawing Sheets

METHOD OF MANUFACTURING A FIBER-REINFORCED STRUCTURE HAVING A HOLLOW BLOW-MOLDING CORE

FIELD OF THE INVENTION

This invention relates to a method of manufacturing a hollow reinforced structure having a blow-molded core. More particularly the invention relates to a fiber reinforced plastic structure having a hollow blow-molded inner core capable of containing a liquid.

BACKGROUND OF THE INVENTION

Fiber Reinforced Plastic (FRP) is used in automotive applications to increase the rigidity and strength of a part while simultaneously reducing its weight. FRP is commonly used for adding strength and rigidity to a preshaped foam core.

FRP has also been used in the manufacture of parts having a hollow core. Hollow core application of FRP involves lining the interior of a mold cavity with fibrous material and placing an inflatable bladder within the mold. The bladder is inflated to form an internal wall surface and a resin injected into the fibrous material. The bladder is either left inside the FRP part or removed. Such a method is described in U.S. Pat. No. 4,863,771, issued Sep. 5, 1989. This method requires a new bladder for each part manufactured and does not provide an integral bond between the inflatable bladder and fibrous material. The inflatable bladder used is made of flexible material which does not add to the strength or rigidity of the final part.

It is also known to blow-mold thermoplastic bottles and containers having an exterior netting reinforcement. For example in U.S. Pat. No. 4,122,142, issued Oct. 24, 1978, a plastic parison was blow-molded to slightly smaller than its desired shape. A tubular netting material was overlaid the still pliable parison. The parison was further blow-molded to its final shape causing the netting reinforcement to partially embed in the parison's exterior surface. This process was primarily designed for thin walled beverage containers and is not suitable for manufacturing structural parts which add strength and rigidity to the article they are made a part of. The reinforcing netting does not maintain the structural integrity of the container when exposed to high temperatures.

It is also known to blow-mold a hollow body having an open-celled sponge material for use as a fuel tank. German patent 2,304,543, issued August 1974, discloses an extruded parison which contains a compressed sponge. The mold die pieces close and parison is inflated to take the shape of the mold cavity. The sponge is allowed to expand and fill the hollow space within the molded tank.

SUMMARY OF THE INVENTION

The present invention provides a method for manufacturing structural FRP parts having an integral blow-molded hollow core. The method utilizes a sheet or tube of bulk fibrous material which is heated to render it compliant. The sheet fibrous material is positioned in a two (2) piece mold tool and a blow-moldable plastic parison is extruded between the sheets or inside the tube of fibrous material. The molding tool is closed and pinches the bottom and the top of the parison extrusion closed. The parison is pressurized with a gas in a blow-molding process. The parison inflates and forces the fibrous material to conform to the shape of the mold cavity. The pliable parison partially embeds itself into the inner surface of the fibrous material to form an integral structure. A liquid resin material is injected into the fibrous material and allowed to cure. The resulting FRP part provides a light weight and integral structure which is capable of confining a liquid such as gasoline.

The preferred embodiment of the invention utilizes a bulk coiled fibrous material. The fibrous material may be either one or more flat sheets. Upon removal of the finished part, new fibrous material is placed into the mold and the molding apparatus is ready for another cycle.

Many types of fiber reinforcement and resin material are capable of withstanding high temperatures. When these high temperature resistant materials are used, the resultant molded article is capable of retaining its structural integrity at the high temperatures which would be encountered in the under body of an automobile. One application for the hollow blow-molded articles described herein are containers such as fuel tanks. By employing high temperature resistant fibrous material and resin, it is possible to provide a molded fuel tank with exterior fibrous reinforcement which can be used in a high temperature environment without the need for additional heat shields or insulation.

The primary object of the present invention is to provide a low cost structural article which may be manufactured by an automated mass production method. The article can be used as a high temperature resistant molded fuel tank without additional heat shields or insulation.

The invention uses high temperature resistant continuous bulk fibrous material and resin to form the exterior wall of the fuel tank.

The methods taught by this invention use continuous feed stock for both the high strength fibrous material and blow-molded core to provide a low cost manufactured article.

It is an additional feature of this invention to use high temperature resistant fibrous material and resin on the exterior surface of a molded fuel tank to withstand high temperatures.

These as well as other objects, features and advantages of the invention will become more apparent to one of ordinary skill in the art upon reference to the flowing detailed description and drawings.

DESCRIPTION OF THE PREFERRED EMBODIMENT

Figure 1:
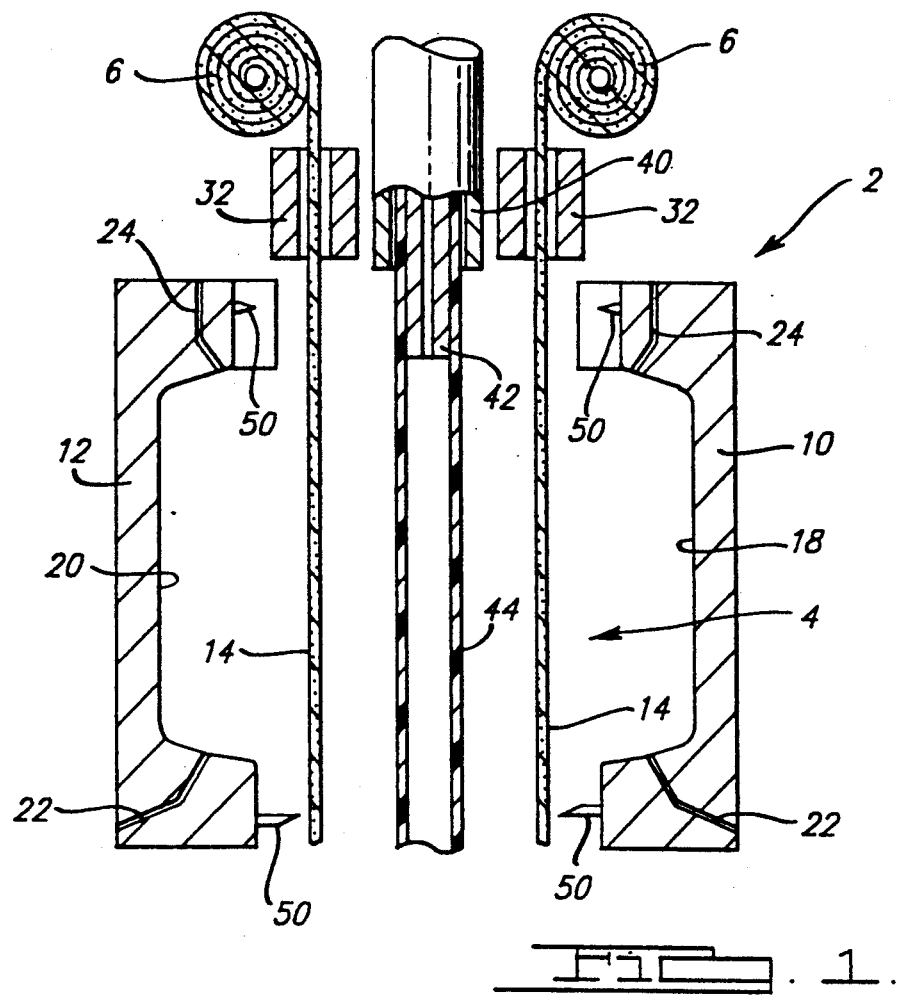
FIGS. 1-4 diagrammatically show the manufacture of a blow-molded FRP fuel tank using two coiled sheets of fibrous material and blow-molding a hollow core.

The preferred embodiment of the invention will be described as an automotive fuel tank and a method of making same. It should be understood, that the methods embodied by this invention can be used for making other FRP structures for other automotive and non-automotive applications. FRP structures made using these methods are not limited to liquid containers. Axle housings, beams, frames, and suspension components as well as other articles may be fabricated using the methods described herein.

A method and apparatus for producing an FRP structure from two coiled sheets of fibrous material is illustrated in FIGS. 1–4. A female molding tool 2 having a die piece 10 and a die piece 12 is used for molding FRP fuel tank 4. Die piece 10 has in interior wall 18 while die piece 12 has an interior wall 20. Interior walls 18, 20 shape the exterior surface of the molded fuel tank 4. Mold 2 is operable to open and close die pieces 10, 12. Mold 2 is shown in the open position in FIG. 1.

Mediate die pieces 10, 12 is extruder 40 and mandrel 42. Extruder 40 extrudes a hollow, tubularly shaped parison for blow-molding. Mandrel 42 is preferably located within extruder 40 and supplies the pressurized gas used in the blow-molding process. Extruder 40 and mandrel 42 are of the type commonly used for blow-molding.

Two coils of bulk fibrous material 6 supply fibrous sheet 14 to mold 2. Fibrous sheets 14 are dispensed adjacent to and overlie interior walls 18 and 20. Bulk fibrous material is preferably made into coils or rolls, but may be any elongated stock such as a pleated or folded stock.

The bulk fibrous sheet material can be any type of fibrous mat which can be injected with a liquid resin including cellulosic, polyester, nylon, acrylic, glassfibers, aromatic polyamide fibers or carbon fibers. Especially preferred for use in this invention are the aromatic polyamide fibers Nomex TM or Kevlar TM manufactured by E. I. duPont de Nemours & Company. The fibers may be in a continuous swirl, random chop or oriented configuration as well as being contained in a woven or knitted fabric. The fibers are treated with a binder to maintain a flat shape and so they may be rolled into coils. The binder is preferably selected from an adhesive or thermoplastic which will soften when heated. Fibrous sheets 14 are drawn through heaters 32 to soften the binder material and make sheets 14 pliable. Sheets 14 are then drawn into mold 2 until they reach the bottom of die pieces 10, 12.

Figure 2:
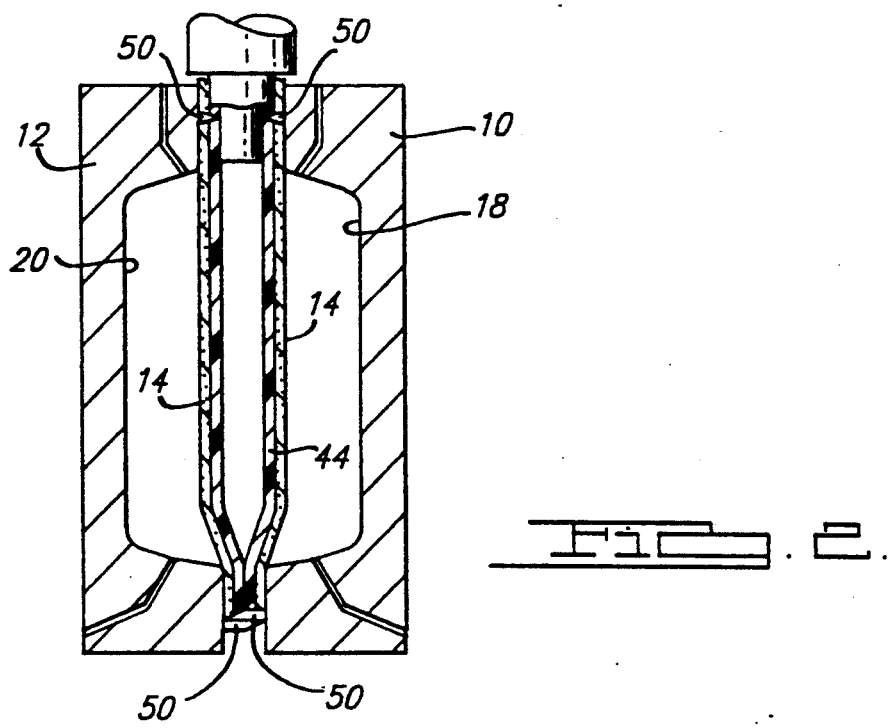

Extruder 40 extrudes a tubular parison 44 of blow-moldable material. Many materials are known for use in blow-molding, but especially preferred are materials containing primarily polypropylene or polyethylene. A length of parison 44 sufficient to completely fill the length of mold 2 is extruded. Parison 44 is sealed at the bottom portion by the closing of mold 2 as shown in FIG. 2.

Closing mold 2 causes die pieces 10 and 12 to move toward one another, pinching the bottom portion of parison 44 closed. Edges 50 surround the perimeter of inner walls 18, 20 and sever fibrous sheets 14 from bulk coils 6. Edges 50 slightly over lap one another and serve to tightly seal mold 2 during the molding process.

Figure 3:
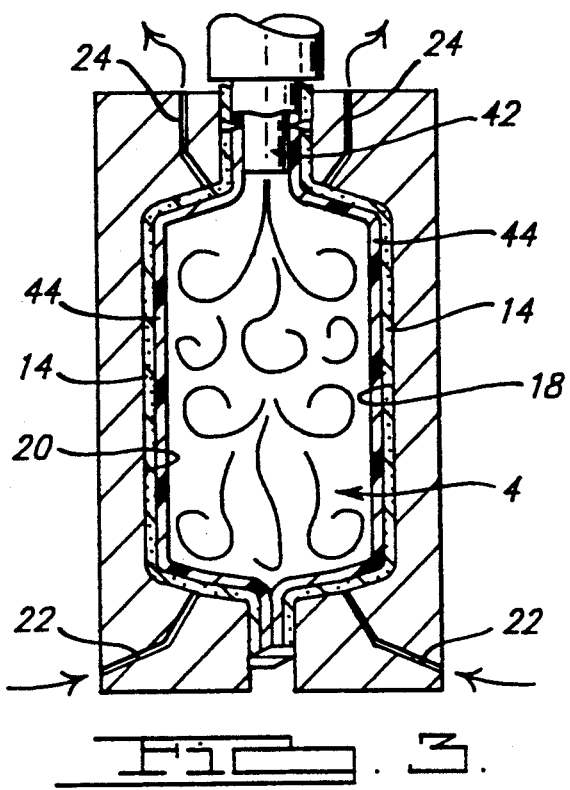

A blow-molding mandrel 42 supplies pressurized gas to parison 44 as shown in FIG. 3. Parison 44 inflates and is forced against fibrous sheets 14. Fibrous sheets 14 are still pliable and conform to the shape of mold walls 18, 20. Parison 44 partially permeates the surface of fibrous sheets 14 to form an integral structure. Mold die pieces 10, 12 may be heated to maintain the pliability of fibrous sheets 14.

To assist in the injection of resin, it may be desirable to reduce the pressure to parison 44 after the parison has had an opportunity to impregnate itself into fibrous sheets 14. The pressure reduction will cause parison 44 to contract slightly and cause fibrous sheets 14 to be pulled away from mold walls 18, 20 creating a small gap of approximate 1 to 5 mm between inner mold walls 18, 20 and fibrous sheets 14. This gap permits the free flow of liquid resin throughout the mold and fibrous sheets 14.

Liquid resin is injected through inlet ports 22 to completely impregnate fibrous sheets 14. Outlet ports 24 vent air form within fibrous sheets 14 to assure that there are no voids or cavities within the fibrous material that are not filled with resin. After the fibrous material is completely impregnated with liquid resin, mandrel 42 increases the pressure to Parison 44 sufficient to cause fibrous sheets 14 to conform to the shape of inner walls 18, 20. Excess liquid resin 13 may be expelled through outlet ports 24.

The foregoing cycle of pressure reduction and increase may be repeated as necessary to insure that the fibrous material is completely impregnated with resin. The reduction and increase cycle also helps to insure that resin wets the entire surface of inner walls 18, 20 to Provide a fuel tank 4 with a smooth exterior surface of resin material. The smooth exterior surface provides an attractive appearance for finished components and protects the fibrous material from delaminating or degrading from exposure to fuels, oils, exhaust fumes and the like.

Figure 4:
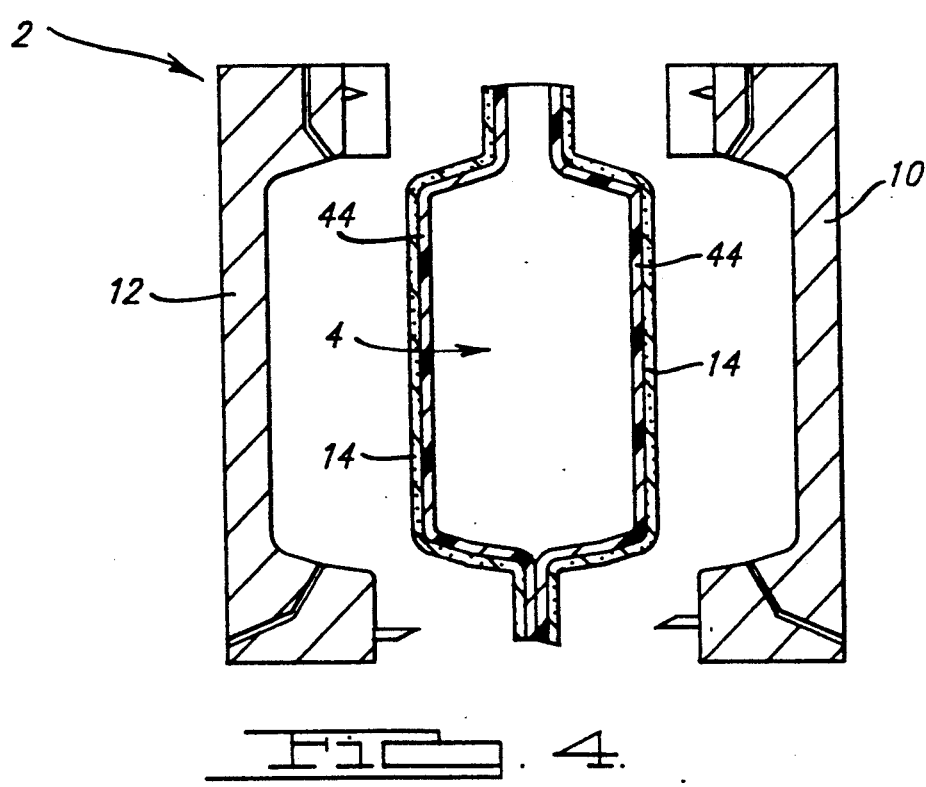

After the fibrous material has been completely impregnated with resin, the increased pressure is maintained within parison 44 until the resin cures and parison 44 cools. After this time, both the resin impregnated fibrous sheets 14 and parison 44 are individually capable of maintaining their desired shape. Mold 2 is opened and the completed fuel tank 4 is removed as shown in FIG. 4. Mold 2 is in position to accept a new parison and new fibrous sheet material.

The embodiments described above and illustrated in FIGS. 1–4 show a FRP part having a continuous exterior shell of resin impregnated fibrous material. Because the invention combines the use of a solid blow-molded hollow core, the exterior fibrous reinforcement need not be continuous or cover the complete exterior of the hollow core. A single sheet of fibrous material may be used to provide a lesser degree of strength and rigidity and provide structural integrity to only one side of the fuel tank. When only one sheet or a non-continuous sheet of fibrous material is used, the parison inflates to contact the inner mold wall in those areas lacking fibrous reinforcement material. Liquid resins should still be injected to all areas of the fibrous material.

The fibrous material together with a liquid resin is resistant to high temperatures. Kevlar TM and carbon fibers one known to have high glass transition temperatures and a FRP part made from these materials is believed capable of maintaining its structural integrity when exposed to high temperatures. A part having an exterior wall comprising a FRP can maintain its shape under temperatures which would cause the deformation of blow-molded thermoplastics such as polypropylene or polyethylene. If a part such as a fuel tank manufactured by the process disclosed is exposed to high temperatures for a prolonged period, the blow-molded interior may begin to soften somewhat, but the FRP exterior shell will maintain the fuel tank's integrity and resist the leakage of fuel.

The invention as described above is particularly well suited for the manufacture liquid carrying containers; specifically automotive fuel tanks. However, the method and article described may be adapted to form other irregularly shaped structures for both automotive and non-automotive applications. Such other structures need not be limited to a liquid containing article. For example, the invention may be used to manufacture axle housings, frames, beams and other automotive body parts. When the proceeding invention is used for fabricating an automotive fuel tank, the exterior fiber reinforced plastic material provides high temperature structural integrity to the fuel tank thus eliminating the need for add-on heat shields or insulators. The exterior fiber reinforced structure also may be adapted to provide rigidity and strength to the fuel tank or the vehicle containing the fuel tank.

Clips or brackets may be attached directly to the fiber reinforced structure as described in U.S. Pat. No. 4,849,147, issued Jul. 18, 1989 incorporated herein by reference. These clips or brackets can be used to secure the fuel tank to the vehicle or to secure accessory components such as filler tubes, vent valves and fuel lines to the fuel tank.

It should be understood that various modifications of the preferred embodiment can be used. For example, the broad teachings of this invention are applicable to the manufacture of fluid containing vessels and structural components. Various blow-molding technologies enable irregularly shaped structures to be manufactured. Horizontal blow-molding techniques enable the fabrication of angled and irregular structures. It is understood by those skilled in the art in view of the present disclosure that various changes and modifications may be made without departing from the scope of the invention. The claims appended hereto are intended to cover all such changes and modifications.

I claim:

1. A method of manufacturing a hollow fiber reinforced structure, using a mold having interior walls defining said structure, said mold having an inlet port communicating with said interior walls for the injection of resin, said method comprising the steps of:
   dispensing a fibrous material along said interior walls;
   extending a blow-moldable parison in said mold and applying pressure to inflate said parison, wherein said parison forces said fibrous material against said interior walls of said mold;
   injecting resin through said inlet port to impregnate said fibrous material with resin; and
   curing said resin to form said hollow fiber reinforced structure.

2. The method of claim 1, further comprising: venting gas from said fibrous materials through an outlet port communicating with said interior walls, after the step of injecting said resin through said inlet port.

3. The method of claim 1 wherein said parison is selected from the group consisting of polypropylene and polyethylene and said fibrous material is selected from the group consisting of cellulosic, polyester, nylon, acrylic, glass, aromatic polyamide and carbon fibers.

4. The method of claim 1, further comprising opening said mold and removing said structure after the step of curing said resin.

5. A method of manufacturing a hollow fiber reinforced structure, using a mold having interior walls defining said structure, said mold having an inlet port communicating with said interior walls for the injection of resin, said method comprising the steps of:
   dispensing a fibrous material along said interior walls;
   dispensing a blow-moldable parison in said mold and applying pressure to inflate said parison wherein said parison forces said fibrous material against said interior walls of said mold;
   injecting resin through said inlet port to impregnate said fibrous material with resin;
   reducing pressure to partially deflate said parison, thereby causing said fibrous material to pull away from said interior walls; and
   curing said resin to form said hollow fiber reinforced structure.

6. The method of claim 5, further comprising reapplying pressure to said pattern after the step of injecting said resin and before the step of curing said resin, thereby causing said fiberous material to conform to the shape of said interior walls.

7. A method of manufacturing a hollow fiber reinforced structure, using a mold having two or more die pieces, each said die piece, having interior walls defining said structure and an inlet port communicating with the interior walls of each said die piece for the injection of resin, said method comprising the steps of:
   dispensing a fibrous material adjacent said interior walls;
   closing said mold to form a mold chamber;
   extruding a blow-moldable parison in said mold chamber interior of said fibrous material;
   applying pressure to inflate said parison, wherein said parison forces said fibrous material against said interior walls of said mold;
   injecting resin through said inlet port to impregnate said fibrous material with resin; and
   curing said resin and said parison to form said hollow structure.

8. The method of claim 7, further comprising venting gas from said fibrous material through an outlet port communicating with said interior walls, after the step of injecting said resin through said inlet and before curing said resin.

9. The method of claim 7 wherein said parison is polyethylene.

10. A method of manufacturing a hollow fiber reinforced structure, using a mold having two or more die pieces, each said die piece having interior walls defining said structure and an inlet port communicating with the interior walls of each said die piece for the injection of resin, said method comprising the steps of:
   dispensing a fibrous material adjacent said interior walls;
   closing said mold to form a mold chamber;
   dispensing a blow-moldable parison in said mold chamber interior of said fibrous material;
   applying pressure to inflate said parison; wherein said parison said fibrous material against said interior walls and said mold;
   injecting resin through said inlet port to impregnate said fibrous material with resin;
   reducing pressure to partially deflate said parison subsequent to the step of applying said pressure and before the step of injecting said resin, thereby causing said fibrous material to pull away from said interior walls; and
   curing said resin and said parison to form said hollow structure.

11. The method of claim 10, further comprising reapplying pressure to said parison after the step of injecting said resin and before the step of curing said resin, thereby causing said fibrous material to conform to the shape of said interior walls.

12. The method of claim 11, further comprising opening said mold and removing said structure after the step of curing said resin.

13. A method of manufacturing a fuel tank, using a mold having two or more die pieces, each said die piece having interior walls defining said structure and an inlet port communicating with the interior walls of each said die piece for the injection of resin, and an outlet port communicating with the interior wall of each said die piece for the venting of gas, said method comprising the steps of:

heating a fibrous material containing a binder to soften said binder;

dispensing said fibrous material adjacent said interior walls;

closing said mold to form a mold chamber;

dispensing a blow-moldable parison in said mold chamber interior of said fibrous material;

applying pressure to inflate said pattern, wherein said parison forces said fibrous material against said interior walls of said mold;

reducing pressure to partially deflate said parison, thereby causing said fibrous material to pull away from said interior walls, injecting resin through said inlet port to impregnate said fibrous material with resin; and reapplying pressure to said parison, thereby causing said fibrous material to conform to the shape of said interior walls;

venting gas from said fibrous material through said outlet port;

curing said resin and said parison to form said hollow structure; and opening said mold and removing said structure.

* * * * *